(12) United States Patent
Van Doren et al.

(10) Patent No.: US 7,818,391 B2
(45) Date of Patent: Oct. 19, 2010

(54) SYSTEM AND METHOD TO FACILITATE ORDERING POINT MIGRATION

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2004 days.

(21) Appl. No.: 10/761,048

(22) Filed: Jan. 20, 2004

(65) Prior Publication Data

US 2005/0198440 A1    Sep. 8, 2005

(51) Int. Cl.
*G06F 15/16* (2006.01)
(52) U.S. Cl. .................................... 709/217
(58) Field of Classification Search ............ 711/141, 711/143; 709/217
See application file for complete search history.

(56) References Cited

U.S. PATENT DOCUMENTS

| | | | |
|---|---|---|---|
| 5,301,298 A | 4/1994 | Kagan |
| 5,489,791 A | 2/1996 | Arima |
| 5,535,116 A | 7/1996 | Gupta |
| 5,706,463 A | 1/1998 | Ebrahim |
| 5,802,577 A | 9/1998 | Bhat et al. |
| 5,829,040 A | 10/1998 | Son |
| 5,875,467 A | 2/1999 | Merchant |
| 5,875,472 A | 2/1999 | Bauman et al. |
| 5,893,922 A | 4/1999 | Baylor |
| 5,945,710 A | 8/1999 | Oda |
| 5,958,019 A | 9/1999 | Hagersten et al. |
| 5,987,571 A | 11/1999 | Shibata |
| 6,049,851 A | 4/2000 | Bryg |
| 6,055,605 A | 4/2000 | Sharma et al. |
| 6,085,263 A | 7/2000 | Sharma et al. |
| 6,108,737 A | 8/2000 | Sharma et al. |
| 6,128,677 A | 10/2000 | Miller |
| 6,138,218 A | 10/2000 | Arimilli |
| 6,245,603 B1 | 6/2001 | Shinohara |
| 6,272,602 B1 | 8/2001 | Singhal |
| 6,345,342 B1 | 2/2002 | Arimilli et al. |
| 6,351,784 B1 | 2/2002 | Neal |
| 6,457,100 B1 | 9/2002 | Ignatowski |
| 6,467,012 B1 | 10/2002 | Alvarez |
| 6,484,240 B1 | 11/2002 | Cypher |

(Continued)

FOREIGN PATENT DOCUMENTS

JP    10-189951    7/1998

(Continued)

OTHER PUBLICATIONS

Rajeev, Joshi, et al., "Checking Cache-Coherence Protocols with TLA+", Kluw er Academic Publishers, 2003, pp. 1-8.

(Continued)

*Primary Examiner*—Benjamin R Bruckart
*Assistant Examiner*—Farhad Ali

(57) ABSTRACT

A system includes a first node that broadcasts a request for data. A second node having a first state associated with the data defines the second node as an ordering point for the data. The second node provides a response to the first node that transfers the ordering point to the first node in response to the request for the data.

24 Claims, 6 Drawing Sheets

U.S. PATENT DOCUMENTS

| | | |
|---|---|---|
| 6,490,661 B1 | 12/2002 | Keller et al. |
| 6,529,990 B1 | 3/2003 | Kruse |
| 6,615,319 B2 | 9/2003 | Khare |
| 6,631,401 B1 | 10/2003 | Keller et al. |
| 6,631,448 B2 | 10/2003 | Weber |
| 6,633,960 B1 | 10/2003 | Kessler |
| 6,654,858 B1 | 11/2003 | Asher |
| 6,696,729 B2 | 2/2004 | Adachi |
| 6,711,653 B1 | 3/2004 | Quach et al. |
| 6,745,272 B2 | 6/2004 | Owen |
| 6,751,721 B1 | 6/2004 | Webb |
| 6,877,056 B2 | 4/2005 | Cypher |
| 6,883,070 B2 | 4/2005 | Martin |
| 6,922,756 B2 | 7/2005 | Hum |
| 6,931,496 B2 | 8/2005 | Chen |
| 6,993,631 B2 * | 1/2006 | Rowlands ................... 711/145 |
| 7,032,079 B1 | 4/2006 | Bauman |
| 7,143,245 B2 | 11/2006 | Tierney |
| 7,149,852 B2 | 12/2006 | Van Doren |
| 7,171,521 B2 | 1/2007 | Rowlands |
| 7,176,097 B2 | 2/2007 | Hiraizumi |
| 7,222,220 B2 | 5/2007 | Cypher |
| 7,395,374 B2 | 7/2008 | Tierney |
| 2001/0034815 A1 | 10/2001 | Dungan et al. |
| 2002/0009095 A1 | 1/2002 | Van Doren et al. |
| 2002/0073071 A1 | 6/2002 | Pong et al. |
| 2002/0129211 A1 | 9/2002 | Arimilli |
| 2003/0018739 A1 | 1/2003 | Cypher et al. |
| 2003/0140200 A1 | 7/2003 | Jamil et al. |
| 2003/0145136 A1 | 7/2003 | Tierney et al. |
| 2003/0195939 A1 | 10/2003 | Edirisooriya et al. |
| 2003/0200397 A1 | 10/2003 | McAllister et al. |
| 2003/0217236 A1 | 11/2003 | Rowlands |
| 2004/0002992 A1 * | 1/2004 | Cypher et al. ............... 707/102 |
| 2004/0068624 A1 | 4/2004 | Van Doren |
| 2004/0123047 A1 | 6/2004 | Hum |
| 2004/0123052 A1 | 6/2004 | Beers |
| 2004/0181636 A1 | 9/2004 | Martin |
| 2005/0013294 A1 | 1/2005 | Cypher |
| 2005/0053057 A1 | 3/2005 | Deneroff |
| 2005/0060502 A1 | 3/2005 | Tan |
| 2005/0160238 A1 | 7/2005 | Steely, Jr. |
| 2005/0251626 A1 * | 11/2005 | Glasco ....................... 711/133 |
| 2005/0251631 A1 | 11/2005 | Rowlands |

FOREIGN PATENT DOCUMENTS

| | | |
|---|---|---|
| JP | 2000-232075 | 8/2000 |
| JP | 2003-017578 | 1/2003 |

OTHER PUBLICATIONS

Martin, Milo M.K. et al., "Token Coherence: Decoupling Performance and Correctness", ISCA-30, pp. 1-12, Jun. 9-11, 2003.

Acacio, Manuel E., et al., "Ow ner Prediction for Accelerating Cache-to-Cache Transfer Misses in a cc-NUMA Architecture", IEEE 2002.

Gharachorloo, Kourosh, et al., "Architecture and Design of AlphaServer GS320", Western Research Laboratory, (Date Unknown).

Gharachorloo, Kourosh, et al., "Memory Consistency and Event Ordering in Scalable Shared-Memory Multiprocessors", Computer Systems Laboratory, pp. 1-14, (Date Unknown).

Notice of Allowance dated Jun. 8, 2006 for U.S. Appl. No. 10/761,044 in the United States.

Final Office Action dated Mar. 21, 2007 for U.S. Appl. No. 10/760,599 in the United States.

Non-Final Office Action dated Oct. 6, 2006 for U.S. Appl. No. 10/760,599 in the United States.

Non-Final Office Action dated Apr. 19, 2006 for U.S. Appl. No. 10/760,599 in the United States.

Final Office Action dated Apr. 18, 2007 for U.S. Appl. No. 10/760,640 in the United States.

Non-Final Office Action datedOct. 10, 2006 for U.S. Appl. No. 10/760,640 in the United States.

Non-Final Office Action dated Apr. 19, 2006 for U.S. Appl. No. 10/760,640 in the United States.

Final Office Action dated Dec. 4, 2006 for U.S. Appl. No. 10/760,813 in the United States.

Non-Final Office Action dated Jun. 29, 2006 for U.S. Appl. No. 10/760,813 in the United States.

Non-Final Office Action dated May 14, 2009 for U.S. Appl. No. 10/761,048 in the United States.

Non-Final Office Action dated Sep. 17, 2008 for U.S. Appl. No. 10/761,048 in the United States.

Final Office Action dated Mar. 13, 2007 for U.S. Appl. No. 10/760,652 in the United States.

Non-Final Office Action dated Jul. 25, 2006 for U.S. Appl. No. 10/760,652 in the United States.

Notice of Allowance dated Feb. 28, 2008 for U.S. Appl. No. 10/760,651 in the United States.

Non-Final Office Action dated Sep. 7, 2007 for U.S. Appl. No. 10/760,651 in the United States.

Non-Final Office Action dated Mar. 28, 2007 for U.S. Appl. No. 10/760,651 in the United States.

Non-Final Office Action dated Oct. 18, 2006 for U.S. Appl. No. 10/760,651 in the United States.

Non-Final Office Action dated May 19, 2006 for U.S. Appl. No. 10/760,651 in the United States.

Non-Final Office Action dated Dec. 19, 2005 for U.S. Appl. No. 10/760,651 in the United States.

Notice of Allowance dated Jun. 29, 2006 for U.S. Appl. No. 10/761,034 in the United States.

Final Office Acton dated Apr. 20, 2007 for U.S. Appl. No. 10/760,659 in the United States.

Non-Final Office Acton dated Nov. 17, 2006 for U.S. Appl. No. 10/760,659 in the United States.

Non-Final Office Acton dated May 23, 2006 for U.S. Appl. No. 10/760,659 in the United States.

Final Office Acton dated Mar. 29, 2007 for U.S. Appl. No. 10/761,073 in the United States.

Non-Final Office Acton dated Oct. 6, 2006 for U.S. Appl. No. 10/761,073 in the United States.

Notice of Allowance dated Sep. 27, 2006 for U.S. Appl. No. 10/760,463 in the United States.

Non-Final Office Action dated Mar. 31, 2006 for U.S. Appl. No. 10/760,463 in the United States.

Final Office Action dated Nov. 4, 2005 for U.S. Appl. No. 10/760,463 in the United States.

Non-Final Office Action dated Feb. 25, 2005 for U.S. Appl. No. 10/760,463 in the United States.

Non-Final Office Action dated Sep. 22, 2004 for U.S. Appl. No. 10/760,463 in the United States.

Notice of Allowance dated Jun. 2, 2009 for U.S. Appl. No. 10/761,047 in the United States.

Final Office Action dated Feb. 4, 2009 for U.S. Appl. No. 10/761,047 in the United States.

Non-Final Office Action dated Aug. 20, 2008 for U.S. Appl. No. 10/761,047 in the United States.

Non-Final Office Action dated Mar. 6, 2008 for U.S. Appl. No. 10/761,047 in the United States.

Non-Final Office Action dated Sep. 20, 2007 for U.S. Appl. No. 10/761,047 in the United States.

Final Office Action dated Jun. 14, 2007 for U.S. Appl. No. 10/761,047 in the United States.

Non-Final Office Action dated Dec. 18, 2006 for U.S. Appl. No. 10/761,047 in the United States.

Non-Final Office Action dated Jun. 15, 2006 for U.S. Appl. No. 10/761,047 in the United States.

Scheurich et al., "The Design Of A Lockup-free Cache For High-Performance Multiprocessors", Nov. 14-18, 1988 Supercomputing '88 (vol. 1) Proceedings pp. 352-359.

Laudon et al., "The SGI Orgin: A ccNUMA Highly Scalable Server", 1997 International Conference on Computer Architecture, pp. 241-251.

Martin, Milo M.K., et al., "Token Coherence: Decoupling Performance And Correctness", ISCH-30, pp. 1-12, Jun. 9-11, 2003.

Rajeev, Joshi et al., "Checking Cache-Coherence Protocols With TLA+", Kluwer Adacemic Publishers, 2003, pp. 1-8.

Handy, "The Cache Memory Book", 1998, Academic Press second edition, pp. 144-155.

Chen et al., "Write Caching in Distributed Filed Systems", Distributed Computing Systems, 1995., Proceedings Of The 15th Int'l Con., May 30-Jun. 2, 1995, pp. 457-466.

Archibald et al., "Cache Coherence Portocols: Evaluation Using A Mulitprocessor Simulation Model", Nov. 1986, ACM Transactions on Computer Systems, pp. 273-298.

Gharachorloo, Kourosh et al., "Architecture and Design of AlphaServer GS320", Western Research Laboratory, (Date Unknown).

Gharachorloo, Kourosh et al., "Memory Consistency And Event Ordering In Scalable Shared-Memory Multiprocessors", Computer Systems Laboratory, pp. 1-14(Date Unknown).

Martin et al., "Bandwidth Adaptive Snooping", Proceedings Of The Eighth International Symposium On High-Performance Computer Architecture (HPCA'02), 2002 IEEE.

Acacio, Manuel et al., "Owner Prediction For Accelerating Cache-to-Cache Transfer Misses In A cc-NUMA Architecture", IEEE 2002.

Examiner's Answer dated Jan. 31, 2008 for U.S. Appl. No. 10/760,599 in the United States.

Examiner's Answer dated Aug. 22, 2008 for U.S. Appl. No. 10/760,640 in the United States.

Examiner's Answer dated Jun. 17, 2008 for U.S. Appl. No. 10/760,813 in the United States.

Examiner's Answer dated Jun. 10, 2008 for U.S. Appl. No. 10/760,652 in the United States.

Examiner's Answer dated Feb. 8, 2008 for U.S. Appl. No. 10/760,659 in the United States.

Examiner's Answer dated Mar. 13, 2008 for U.S. Appl. No. 10/761,073 in the United States.

Examiner's Interview Summary dated Jan. 28, 2008 for U.S. Appl. No. 10/760,651 in the United States.

* cited by examiner

SYSTEM AND METHOD TO FACILITATE ORDERING POINT MIGRATION

RELATED APPLICATIONS

This application is related to the following commonly assigned co-pending patent applications entitled:
"CACHE COHERENCY PROTOCOL WITH ORDERING POINTS," application Ser. No. 10/760,640; "SYSTEM AND METHOD FOR RESOLVING TRANSACTIONS IN A CACHE COHERENCY PROTOCOL," application Ser. No. 10/760,813; "SYSTEM AND METHOD TO FACILITATE ORDERING POINT MIGRATION TO MEMORY," U.S. Ser. No. 10/760,599; "SYSTEM AND METHOD FOR CREATING ORDERING POINTS," application Ser. No. 10/760,652; "SYSTEM AND METHOD FOR CONFLICT RESPONSES IN A CACHE COHERENCY PROTOCOL WITH ORDERING POINT MIGRATION," application Ser. No. 10/760,651; "SYSTEM AND METHOD FOR READ MIGRATORY OPTIMIZATION IN A CACHE COHERENCY PROTOCOL," application Ser. No. 10/761,044; "SYSTEM AND METHOD FOR BLOCKING DATA RESPONSES," application Ser. No. 10/760,034; "SYSTEM AND METHOD FOR NON-MIGRATORY REQUESTS IN A CACHE COHERENCY PROTOCOL," application Ser. No. 10/760,659; "SYSTEM AND METHOD FOR CONFLICT RESPONSES IN A CACHE COHERENCY PROTOCOL WITH ORDERING POINT MIGRATION," application Ser. No. 10/761,073; "SYSTEM AND METHOD FOR CONFLICT RESPONSES IN A CACHE COHERENCY PROTOCOL," application Ser. No. 10/761,047; "SYSTEM AND METHOD FOR RESPONSES BETWEEN DIFFERENT CACHE COHERENCY PROTOCOLS," application Ser. No. 10/760,436, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of requested the data is stored in the respective caches. Thus, correct ownership and usage of the data are determined by the collective responses to the snoops.

SUMMARY

One embodiment of the present invention may comprise a system that includes a first node that broadcasts a request for data. A second node having a first state associated with the data defines the second node as an ordering point for the data. The second node provides a response to the first node that transfers the ordering point to the first node in response to the request for the data.

Another embodiment of the present invention may comprise a computer system. The computer system includes a source processor that issues a broadcast request for desired data while having a first state associated with the desired data. An owner processor has an associated cache that includes the desired data in a cache line. The cache line has an associated state that defines the copy of the desired data as an ordering point for the data. The owner processor responds to the broadcast request with an ownership data response that includes the desired data. The source processor transitions from the first state to a second state associated with the desired data based on the ownership data response, the second state defining the first processor as the ordering point for the desired data.

Yet another embodiment of the present invention may comprise a method that includes broadcasting from a source node a request for requested data. An ownership data response is provided from an owner node in response to the request from the source node. A state at the source node associated with the requested data is transitioned from a first state to a second state in response to receiving the ownership data response, the second state defining the source node as a new cache ordering point.

DETAILED DESCRIPTION

This disclosure relates generally to a coherency protocol that facilitates migration of an ordering (or serialization) point for data. The coherency protocol can also enable ordering point migration while a broadcast-based protocol continues to run, processing requests and responses associated with the data. The state of the data stored in the cache can define the ordering point associated with the data, which can be transferred from one cache to another.

Figure 1:
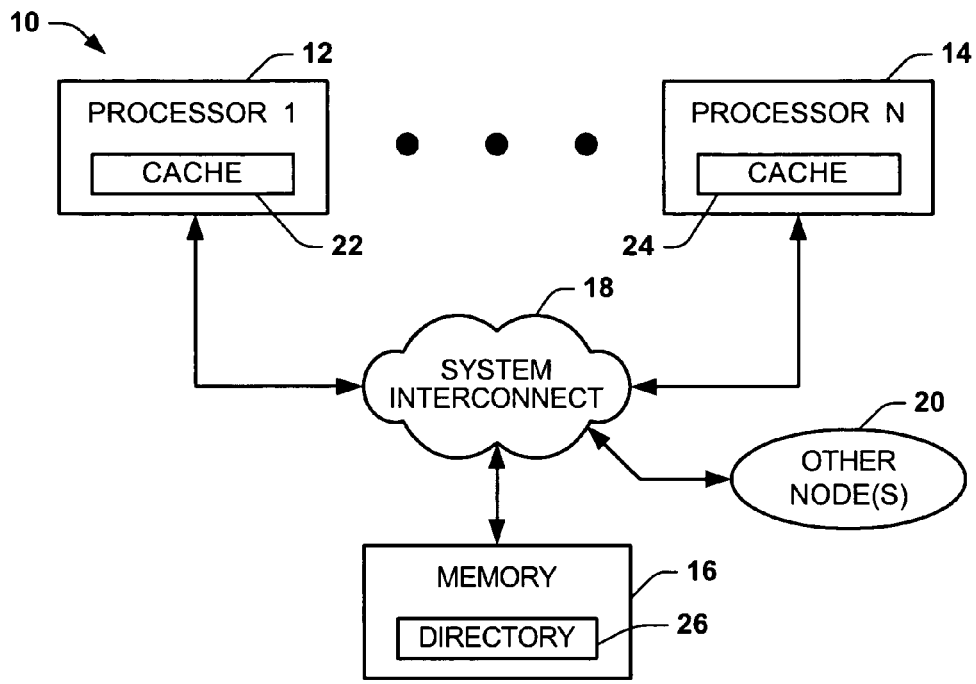
FIG. 1 depicts an example of a multiprocessor system.

FIG. 1 depicts an example of a system 10 that facilitates migration of an ordering point for data. As used herein, an ordering point defines a serialization of requests to the same memory line (or memory block) that is understood and followed by the system 10 (e.g., an ordering point can respond to requests).

The system 10 illustrates a multi-processor environment that includes a plurality of processors 12 and 14 (indicated at PROCESSOR 1 through PROCESSOR N, where N is a positive integer (N>1)). The system 10 also includes memory 16 that provides a single shared address space for the system. The memory 16, for example, can be a globally accessible aggregate memory, such as can be implemented as one or more memory nodes. For example, the memory 16 can include one or more memory storage devices (e.g., dynamic random access memory (DRAM)).

The processors 12 and 14 and memory 16 define nodes in the system 10 that can communicate with each other via a system interconnect 18. For example, the system interconnect 18 can be implemented as a switch fabric or a hierarchical switch. Also associated with the system 10 can be one or more other nodes, indicated schematically at 20. The other nodes 20 can correspond to one or more additional processors or other multi processor systems (e.g., one or more symmetric multiprocessor (SMP) nodes) connected to the system interconnect 18, such as through an appropriate interconnect interface (not shown).

Each of the processors 12, 14 includes at least one corresponding cache 22 and 24. For purposes of brevity, each of the respective caches 22 and 24 are depicted as unitary memory structures, although they may include a plurality of memory devices or different cache levels. Each of the caches 22 and 24 includes a plurality of cache lines. Each cache line has an associated tag address that identifies corresponding data stored in the line. The system 10 employs the caches 22 and 24 and the memory 16 to store blocks of data, referred to as "memory blocks." A memory block can occupy part of a memory line, an entire memory line or span across multiple lines. For purposes of simplicity of explanation, however, this description assumes that a "memory block" occupies a single "memory line" in memory or a "cache line" in a cache.

Each cache line can also include information identifying the state of the data stored in the respective cache. A given memory block can be stored in a cache line of one or more of the caches 22 and 24 as well as in a memory line of the memory 16, depending on the state of the line. Whether a cache line contains a coherent copy of the data also depends on the state of the cache line. Certain states employed by the coherency protocol can define a given cache line as an ordering point for the system 10.

The system 10 implements a cache coherency protocol to manage the sharing of memory blocks so as to ensure coherence of data. The coherency protocol establishes rules for transitioning between states, such as if data is read from or written to memory 16 or one of the caches 22 and 24. For example, the system 10 can implement a broadcast-based protocol. Alternatively, the system 10 can employ a hybrid protocol employing both a broadcast-based protocol and a forward progress protocol, such as a directory-based protocol.

As used herein, a node that issues a request, such as a read or write request, defines a source node. Other nodes within the system 10 are potential targets of the request. Additionally, each memory block in the system 10 can be assigned a "home node" that maintains necessary global information and a data value for that memory block. The home node can be implemented in the memory 16.

For example, in a directory-based protocol, the memory 16 can operate as the home node and include a directory 26. The memory 16 employs the directory 26 to ascertain where in the system 10 a coherent copy of the requested data should be located for each memory block. While a single memory 16 is depicted in FIG. 1, as mentioned above, multiple memory structures could be utilized, each maintaining global information for different groups of memory blocks.

By way of further example, when a source node, such as the processor 12, requires a copy of a given memory block, the source node typically first requests the memory block from its local, private cache by identifying the address associated with the memory block. If the data is found locally, the memory access is resolved without communication via the system interconnect 18. When the requested memory block is not found locally, the source node 12 can request the memory block from the system 10 according to the protocol(s) being implemented. In addition to the request identifying an address associated with the requested memory block, the request usually identifies the type of request or command being issued by the requestor. The protocol implemented by the system 10 for processing a given request defines the available states and possible state transitions at each respective node 12, 14, 16, 20. Additionally, the type of response and whether a response will be provided depends upon the type of request, as well as the state of the identified memory block contained in the responding nodes.

A set of cache states that can be implemented by the system 10 for a respective cache line is depicted below in Table 1. Since there are eight possible states, the state information can be encoded by a three-bit data word, for example.

TABLE 1

| STATE | DESCRIPTION |
| --- | --- |
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up to date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified - The cache line is valid and has been modified by the caching processor. The caching processor has the only cached copy in the system, and the caching processor must respond to snoops by returning data and must write data back to memory upon displacement. |

TABLE 1-continued

| STATE | DESCRIPTION |
|---|---|
| O | Owned - The cache line is valid and more up to date than memory. The caching processor may have modified the cache line. Other processors may have valid copies, and the caching processor must respond to snoops by returning data and must write data back to memory upon displacement. |
| T | Transition - The cache line is in transition. The cache line may be transitioning from O, M, E, F or D to I, or the line may be transitioning from I to any one of the valid states. |

As mentioned above, the state of a cache line can be utilized to define a cache ordering point in the system 10. In particular, for a protocol implementing the states set forth in Table 1, a cache line having one of the states M, O, E, F or D can serve as an ordering point for the data contained in that cache line. As a result, the broadcast-based coherency protocol provides that the system 10 can transfer the ordering point for a given cache line from an owner node (the node serving as the current ordering point) to the cache of a destination node to serve as a new ordering point.

To mitigate the vulnerability of the ordering point during migration, the cache line of the owner node transitions to the T-state. Additionally, the destination node can provide a message that acknowledges when the ordering point has successfully migrated. The cache line of the owner node further can transition from the T-state to the I-state in response to receiving the acknowledgment message from the destination node. The owner node can respond to the acknowledgement message by providing a further acknowledgement message back to the destination node. The request that initiated the migration sequence can be considered fulfilled in response to receiving the acknowledgment provided by the owner node.

By way of example, assume that the processor 12 (a source node) requires a copy of data associated with a particular memory address, and assume that the data is unavailable from its own local cache 22. Since the processor 12 does not contain a copy of the requested data, the processor may be initially in the I-state (invalid) for that data or the processor may contain a different line altogether. For purposes of simplicity of explanation, the starting state for this and other examples is referred to as the I-state. The processor 12, operating as the source node, transmits a source broadcast request to the other processor 14, the memory 16 and the other nodes 20 via the system interconnect 18.

Assume, for example, that the request from the processor 12 corresponds to a source broadcast request (e.g., a broadcast read or write command) for a desired cache line, as identified by an address in the request. The request can also identify what type of request is being issued by source node 12. Further, assuming that the processor 14 includes the requested data in a cache line having a state that defines the processor as a cache ordering point for the data, the processor 14 can provide an ownership data response. An ownership data response corresponds to a response that includes a copy of the requested data and an indication that the ordering point is being transferred to the requesting processor 12. Since the ownership data response transfers the ordering point, at most one ownership data response can exist per cache line at any given time. The source processor 12 transitions from the I-state to the D-state in response to receiving the ownership data response, and now serves as the new cache ordering point for the data.

As noted above in Table 1, the D-state corresponds to a dirty cache line state that serves as an ordering point for the cache line. Thus, the processor having a cache line in the D-state can respond to certain types of requests for data with a response that includes a shared copy of the requested data. The cache line providing the shared copy of the data can transition from the D-state to either the S-state or the F-state. Once the processor 12 has the cache line in the D-state, the processor can also respond to requests for data with an ownership data response.

Additionally, the processor 12 may transition from the I-state to the T-state for a time period after receiving the ownership data from the processor 14. The time period can correspond to the amount of time until the processor 12 receives responses from all other nodes in the system 10. While in the T-state, the processor 12 cannot utilize the data, including modifying the data or responding with data to requests. Instead, in the T-state, the processor will respond with a conflict response, as described herein.

The memory 16 as well as the other node 20 also provide responses to the broadcast request from the processor 12. These responses may be MISS responses. A MISS response is a non-data response that may indicate that the responding node does not contain a valid copy of the requested data. For the case of the memory 16, a MISS response can be provided as an acknowledgment signal (e.g., a non-data, low bandwidth response) because the memory understands that another node (e.g., the processor 14) is providing an ownership data response. The response from the processor 14 thus renders a memory data response superfluous. For example, the processor 14, being the present ordering point for the requested data, can transmit a blocking signal to the memory 16 or other home node for the data being requested by the processor 12. The blocking signal can prevent the home node from returning a copy of the data to the requesting processor 12 provided that the blocking signal arrives at the home node prior to the broadcast request for the data. If the blocking signal does not arrive at the home node before the broadcast request, the home node provides a response to the processor 12 that includes a memory copy of the requested data.

The processor 12 also provides a signal to the processor 14 to acknowledge the ordering point migration (e.g., a migration acknowledgement or "MACK" signal). The processor 12 can provide the MACK signal, for example, after receiving responses from all other nodes in the system 10. The processor 14, as the owner node, acknowledges the MACK signal by providing a corresponding response (e.g., a "MACK-ACK") back to the processor 12. The processor 12 can utilize the received data (at least internally) prior to receiving the MACK-ACK signal. The exchange of MACK and MACK-ACK signals between the processors 12 and 14 correspond to maintenance functions that help ensure successful fulfillment of the data request as well as termination of the migration sequence. The exchange of MACK and MACK-ACK signals also operates to transition the processor 14 from the T-state to the I-state.

From the foregoing example, those skilled in the art will appreciate that ordering point migration is facilitated when the system implements a broadcast-based protocol. A broadcast-based protocol, such as a broadcast source snoopy protocol, provides that the source node broadcasts snoops or requests directly to all other nodes in the system 10. Broadcast snoops transmitted by the source node can include read requests, write requests and memory update commands.

The T-state operates to mitigate vulnerability that can occur during migration of a cache ordering point for a given cache line. In particular, while the cache line exists in the T-state, the processor responds to source broadcast requests for the data by returning a conflict response to the requestor.

The conflict response indicates that the cache line may not be reliable. Upon receiving a conflict response, the requestor can reissue the request using a different coherency protocol than the broadcast-based protocol utilized to issue the original broadcast request. For example, the requestor can transition to a forward progress cache coherency protocol, such as a directory-based protocol. Thus, the system 10 can implement a hybrid cache coherency protocol that includes a primary broadcast-based protocol and a secondary directory-based protocol. The secondary protocol can be employed to reissue and process requests in conflict situations. Those skilled in the art will appreciate various directory-based cache coherency protocols could be utilized as the secondary protocol by the system 10.

Figure 2:
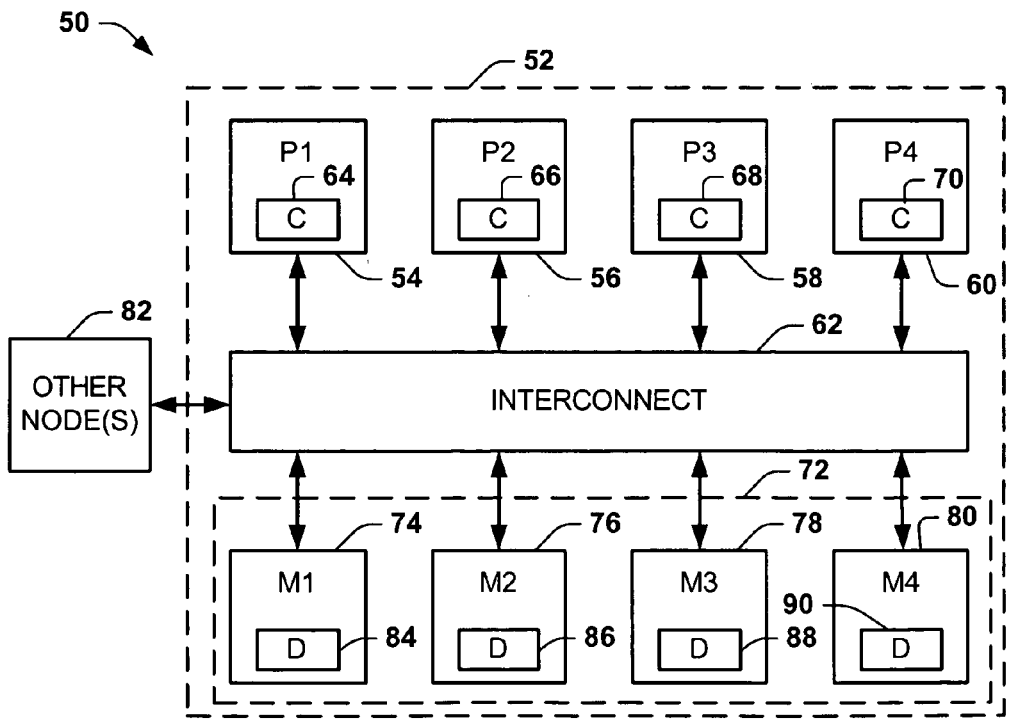
FIG. 2 depicts an example of another multiprocessor system.

FIG. 2 depicts an example of a multiprocessor computing system 50. The system 50, for example, includes an SMP node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58 and 60 are depicted in the example of FIG. 2, those skilled in the art will appreciate that a greater or smaller number of processors can be implemented in the node 52.

Each processor 54, 56, 58 and 60 also includes an associated cache 64, 66, 68 and 70. The caches 64, 66, 68 and 70 can enable faster access to data than from an associated main memory 72 of the node 52. The system 50 implements a cache coherency protocol designed to ensure coherency of data in the system. By way of example, the cache coherency protocol can be implemented to include a source broadcast protocol in which broadcast snoops or requests for data are transmitted directly from a source processor to all other processors and memory in the system 50. The protocol can further be implemented as a hybrid protocol that includes a source broadcast protocol in conjunction with another forward progress protocol, such as a null-directory or other directory-based protocol. The system 50 of FIG. 2, for example, employs the source broadcast protocol to broadcast requests for desired data from a source node. If the request cannot be processed using the source broadcast protocol, such as when a conflict exists, the system 50 transfers to its forward progress protocol and reissues a corresponding request using such protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines how the memory blocks are apportioned in each respective module as well as where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58 and 60 and the memory 70, as well as those to and from the other nodes 82.

When a processor 56 requires desired data, the processor 56 operates as a source and issues a source broadcast snoop (e.g., a broadcast read or write request) to all other processors 54, 58 and 60 as well as to the memory 72 (or at least a home memory module 74, 76, 78 and 80 thereof) via the interconnect 62. The cache coherency protocol implemented in the system 50 is designed to ensure that a correct copy of the data is returned in response to the source broadcast snoop.

For example, the processor 56 broadcasts a snoop request (e.g., a migratory read request) for a copy of the data via the interconnect 62 and receives a corresponding ownership data response from another processor 60. The processor 60 can provide an ownership data response, for example, when the processor 60 has a state (e.g., M, O, E, F or D) associated with the cached data that defines that processor as including a cache ordering point for such data. In conjunction with providing the ownership data response, the processor 60 transitions to the T-state. Additionally, the source processor 56 can transition to the T-state as part of the ordering point migration sequence. The source processor 56 may remain in the T-state until responses to its broadcast request have been received from all other nodes in the system 50. The processor 56 then transitions from the I-state to the D-state, which enables the processor to modify the data as well as to operate as the cache ordering point for the data. As a cache ordering point, the processor 56 can respond to requests for the data, including providing an ownership data response that transfers ordering point to another node. The ordering point can also provide a shared copy of the data to read-only request, which may require a state transition (e.g., from the D-state to the F-state).

The other processors 54 and 58 as well as the memory also respond to the broadcast request issued by the processor 56. The processors 54 and 58 will respond with MISS responses. A MISS response can be provided by a target that does not contain a valid cache line for the requested data or if the target contained a valid cache line, but was invalidated at the target in response to the broadcast request from the processor 56. A home node (e.g., the memory 72) can also provide a MISS response when the broadcast request is intercepted by a blocking signal that arrives at the home node prior to the request.

After receiving the cache ordering point, the processor 56 provides a MACK signal to the processor 60 to acknowledge the ordering point migration. The processor 56 can provide the MACK signal, for example, after receiving responses from all other nodes (e.g., processors and memory) in the system 50. The processor 60 responds to the MACK signal by providing a corresponding MACK-ACK response. The MACK signal enables the processor 60 to transition from the T-state to the I-state.

The latency associated with the ordering point migration during the broadcast-based protocol generally corresponds to only two processor hops (e.g., the broadcast request from the processor 56 to the processor 60 and the response back to processor 56). The processor 56 can utilize the received data prior to completion of the MACK and MACK-ACK exchange. The MACK and MACK-ACK exchange is implemented to release the processor 60 from the T-state as well as to provide confirmation of such state transition. As a cache ordering point, the processor 56 can modify the data or respond to requests for the data. The responses can include providing an ownership data response to transfer the ordering point to another processor in the system 50.

Figure 3:
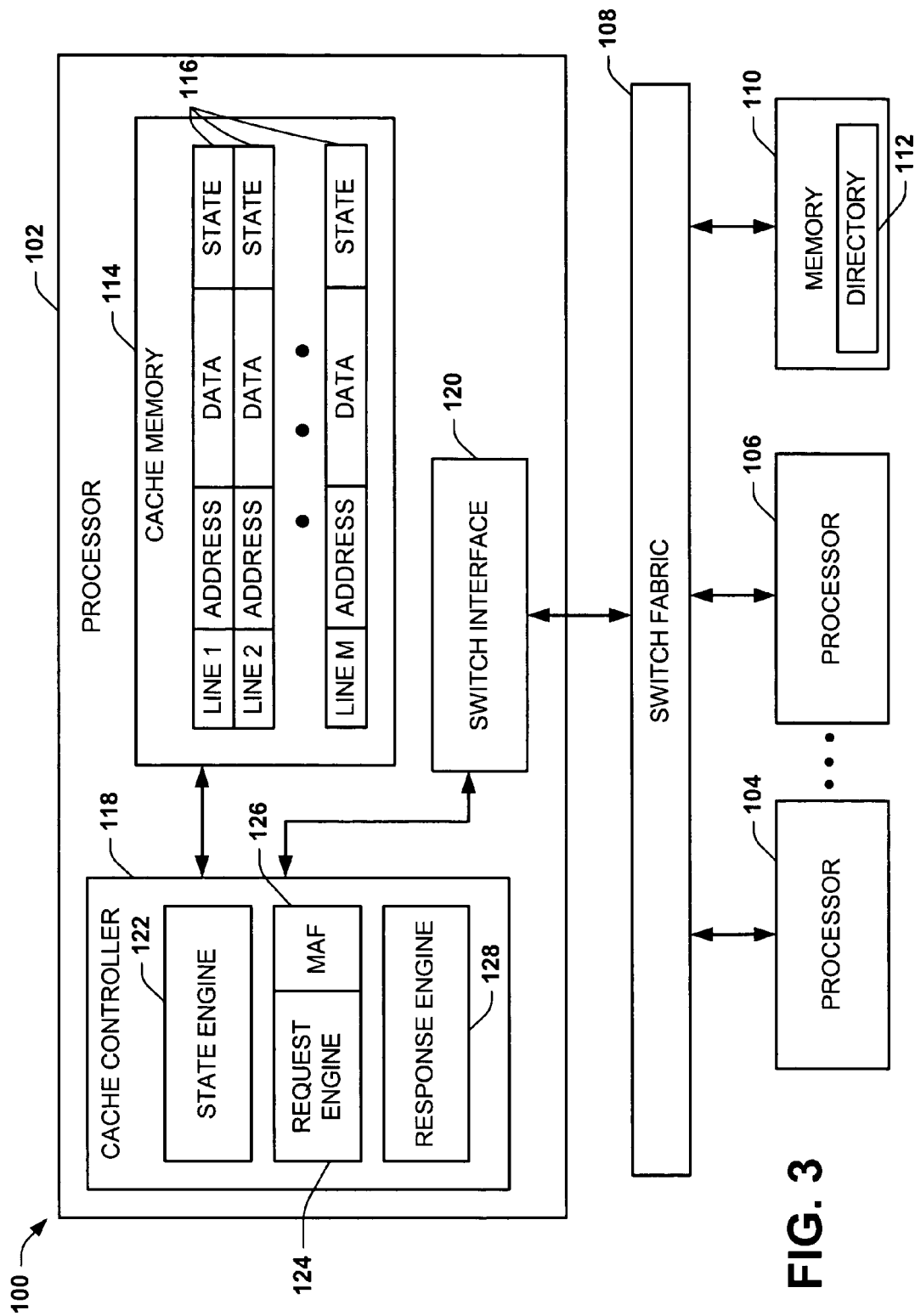
FIG. 3 depicts an example of a processor within a multiprocessor system.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104 and 106. For example, the memory 110 can be implemented as a plurality of separate memory modules, with a variety of module configurations for storing selected data. The system 100, for example, can be implemented as an integrated circuit or as circuitry (e.g., one or more circuit boards) containing plural integrated circuits.

The system 100 can employ a source broadcast cache coherency protocol. In a source broadcast cache coherency protocol, a source processor 102, 104 and 106 can issue a source broadcast request to all other processors in the system and to the memory 110. In the event that conflict arises, or the source broadcast request otherwise fails, the source processor reissues the request using a forward-progress protocol, such as a null-directory or other directory-based protocol.

In a null directory-based protocol, for example, the memory 110 includes home nodes for each cache line. Instead of issuing a broadcast to all cache targets, the source issues a single request to the home node for such data. The home node thus operates as static ordering point for requested data since all requests are sent to the home node for ordering before snoops are broadcast. Since the source node first sends a request to the home node, an additional hop is added for the majority of references compared with a broadcast-based protocol described above. If the system 100 employs a standard directory-based protocols, ordering is implemented, but the memory 110 employs associated directories that facilitate locating the data (e.g., based on the directory state associated with the requested data). In a standard directory protocol, there will be times when the directory can indicate that there are no cached copies, and thus the home node can respond with the data without issuing any snoops to the system 100.

When successful, a snoop broadcast protocol can be implemented with decreased latency relative to the null directory protocol or directory-based protocols when cache hits occur. Thus, by combining the two protocols, the system 100 operates in a more robust and efficient manner, as described herein.

The processor 102 includes cache memory 114 that contains a plurality of cache lines (e.g., lines 1-M, where M is a positive integer, M 1) 116. Each cache line 116 can contain data that includes one or more memory blocks. A tag address (ADDRESS) is associated with the data contained in each cache line 116. Additionally, each cache line 116 contains state information identifying the state of the data contained at that cache line. Examples of states that can be associated with each cache line 116 are identified above in Table 1.

A cache controller 118 is associated with the cache memory 114. The cache controller 118 controls and manages access to the cache memory, including requests for data and responses to requests from other nodes. The cache controller 118 communicates requests and responses to the system 100 via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 3, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol(s) implemented in the system 100. For example, the state engine 122 can modify the state of a given cache line 116 based on requests issued by the processor 102. Additionally, the state engine 122 can modify the state of a given cache line 116 based on responses or requests associated with the address of the given cache line. The responses or requests may be provided, for example, by another processor 104, 106 and/or the memory 110.

Examples of state transitions that can occur in the system 100 for selected processor commands are provided in Table 2. The commands beginning with the term "broadcast" generally correspond to broadcast snoop commands implemented within the context of the source broadcast protocol. Most of the other commands (not beginning with "broadcast") are examples of typical commands that can be implemented within the context of the forward progress protocol (e.g., directory-based protocol), also implemented by the system 100.

TABLE 2

| Command | Current State | | | Next State | | | |
|---|---|---|---|---|---|---|---|
| | Source | Owner | Sharer | Source | Owner | Sharer | Memory |
| Broadcast non-migratory read request | I | I | I | E or F | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | S | O | I | |
| | I | O | I | S | O | I | |
| | I | O | S | S | O | S | |
| Broadcast migratory read request | I | I | I | E | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | D | I | I | |
| | I | O | I | S | O | I | |
| | I | O | S | S | O | S | |
| Broadcast incoherent read - read current data | I | I | I | I | I | I | |
| | I | I | S | I | I | S | |
| | I | E | I | I | E | I | |
| | I | F | I | I | F | I | |
| | I | F | S | I | F | S | |
| | I | D | I | I | D | I | |
| | I | M | I | I | M | I | |

TABLE 2-continued

| Command | Current State | | | Next State | | | Memory |
|---|---|---|---|---|---|---|---|
| | Source | Owner | Sharer | Source | Owner | Sharer | |
| | I | O | I | I | O | I | |
| | I | O | S | I | O | S | |
| Non-migratory read request | I | I | I | E or S | I | I | |
| | I | I | S | S | I | S | |
| | I | E | I | S | S | I | |
| | I | F | I | S | S | I | |
| | I | F | S | S | S | S | |
| | I | D | I | S | S | I | Update |
| | I | M | I | S | S | I | Update |
| | I | O | I | S | S | I | Update |
| | I | O | S | S | S | S | Update |
| Migratory read request | I | I | I | E | S | I | |
| | I | I | S | S | S | S | |
| | I | E | I | S | S | I | |
| | I | F | I | S | S | I | |
| | I | F | S | S | S | S | |
| | I | D | I | S | S | I | Update |
| | I | M | I | E | I | I | Update |
| | I | O | I | S | S | I | Update |
| | I | O | S | S | S | S | Update |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | D | I | I | |
| | I | M | I | D | I | I | |
| | I | O | I | D | I | I | |
| | I | O | S | D | I | I | |
| Broadcast invalidate line | F | — | I | E | I | I | |
| | F | — | S | E | I | I | |
| | O | — | I | D | I | I | |
| | O | — | S | D | I | I | |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Invalidate line | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Invalidate line - no data | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Read-modify with update to memory | I | I | I | E | I | I | |
| | I | I | S | E | I | I | |
| | I | E | I | E | I | I | |
| | I | F | I | E | I | I | |

TABLE 2-continued

| Command | Current State | | | Next State | | | Memory |
|---|---|---|---|---|---|---|---|
| | Source | Owner | Sharer | Source | Owner | Sharer | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Cache flush - FPP only | * | * | * | I | I | I | Update |
| Broadcast memory write back | D/M/O | — | I | I | I | I | Update |
| | D/M/O | — | S | I | I | S | Update |
| Port memory write back | D/M/O | — | I | I | I | I | Update |

The cache controller 118 also includes a request engine 124 for managing requests sent to the system 100. The request engine 124 employs a miss address file (MAF) 126 that contains MAF entries for outstanding requests associated with some subset of the locations in the cache memory 114. The request engine 124 employs the MAF 126 to manage requests issued by the processor 102 as well as responses to such requests. The MAF 126 can be implemented as a table, an array, a linked list or other data structure programmed to manage and track requests for each cache line 116. For example, when the processor 102 requires data associated with a given address line 116, the request engine 124 allocates a corresponding entry in the MAF 126. The MAF entry includes fields that identify, for example, the address of the data being requested, the type of request, and response information (e.g., including data) received from other nodes in response to the request. MAF entries can be utilized to manage requests issued using a broadcast-based protocol as well as a directory-based protocol. While, for purposes of illustration, a single MAF 126 is depicted in FIG. 3, different MAFs might be employed for the requests issued under the different protocols employed by the system 100.

The cache controller 118 also includes a response engine 128 that controls responses provided by the processor 102. The processor 102 provides responses to requests or snoops received via the switch interface 120 from another processor 104-106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for an address identified in a request received from another processor or memory, the cache controller 118 can implement appropriate conflict resolution defined by the coherency protocol. The response engine 128 thus enables the cache controller 118 to send an appropriate response to requestors in the system 100 based on the information in the cache memory 114. A response to a request can also cause the state engine 122 to effect a state transition for an associated cache line 116, such as when providing an ownership data response. Each of the other processor 104-106 can be configured similarly to the processor 102.

By way of further example, assume that the processor 102 requires data not contained locally in its cache memory 114. The request engine 118 will create a MAF entry in the MAF 126, corresponding to the type of request and the address associated with data required. The cache controller 118 broadcasts a source snoop (e.g., a broadcast read-modify command from Table 2) to the system 100 via the switch interface 120 and switch fabric 108. The other processors 104-106 and memory 110 in the system 100 provide corresponding responses.

For example, if the processor 104 does not contain a valid copy of the data for the address identified in the read request, the processor returns a corresponding MISS response. As mentioned above, a MISS response can be provided by a target that does not contain a valid cache line for the requested data or if the target cache line contained a valid cache line, but was invalidated at the target (e.g., in response to the request). A home node (e.g., in the memory 110) can also provide a MISS response when the broadcast request is intercepted by a blocking message.

Assume, for example, that when the processor 106 receives the broadcast request for the data, the processor contains a cache ordering point for the requested data (e.g., the cache line containing the data is in one of the M, O, E, F or D-states). Accordingly, the processor 106 provides an ownership data response to the source processor 102. When the processor 106 provides the ownership data response, the ordering point migrates from the cache of processor 106 to the cache of the processor 102. The processor 106 also changes the state associated with the cache line to the T-state in conjunction with providing the ownership data response. The T-state operates to prevent access to the data (e.g., the processor 106 will provide a conflict response to subsequent broadcast requests) until the ordering point migration has been acknowledged. When another node in the system 100 receives a conflict response from the processor 106, the processor receiving the conflict response can reissue the request using the forward progress protocol.

The ordering point migration can be considered complete when the processor 104 receives the ownership data response from the processor 106 and stores the requested data in its respective cache line 116. The switch interface 120 provides responses to the corresponding MAF entry of the MAF 126 of the cache controller 118. The MAF entry mages the responses stores data based on rules established by the protocol. The MAF engine 124 also employs the state engine 122 to transition the state of the cache line to the D-state in response to the ownership data response. The D-state defines the cache line 116 as a new cache ordering point, which enables the processor 102 to respond to requests for the data and to otherwise utilize the data.

In order to bring the processor 106 out of the T-state, the broadcast-based protocol implemented by the system 100 enables the source processor 102 to send a MACK (migration acknowledgement) signal to the processor 106. In particular, the MAF entry of the MAF associated with the request sends the MACK signal to the processor 104 through the switch interface 120 and awaits corresponding response. The MACK signal can be associated with the entry in the MAF 126 corresponding to the request for the data. The processor 106 transitions from the T-state to the I-state in response to the MACK signal. Additionally, the processor 106 responds to the MACK signal by providing a MACK-ACK signal back to the processor 102 via the switch fabric 108. The switch interface receives the MACK-ACK signal and provides the signal to the MAF 126. The MAF 126 matches the MACK-ACK signal with the appropriate MAF entry, which enables the MAF entry to retire. While the processor 102 can utilize the data prior to receiving the MACK-ACK signal, the MACK-ACK signal confirms that the processor 106 has been released from the T-state. After retiring the MAF entry in the MAF 126 in response to the MAC-ACK signal, the response engine 128 in the processor 102 is free to respond (e.g., as a cache ordering point) to subsequent requests for the data.

In view of the foregoing structural and functional features described above, certain methods that can be implemented using a coherency protocol will be better appreciated with reference FIGS. 4-10. Each of the examples in FIGS. 4-9 illustrates various interrelationships between requests and responses and state transitions that can occur for a given memory address (e.g., memory line) in different memory devices or processor caches. In each of these examples, time flows in the direction of an arrow labeled "TIME." Those skilled in the art may appreciate various other cases that can be implemented using the coherency protocols described herein. The following methodologies can be implemented by hardware (e.g., as one or more integrated circuits or circuit boards containing a plurality of microprocessors), software (e.g., as executable instructions running on one or more processors or controllers), or any combination thereof.

Figure 4:
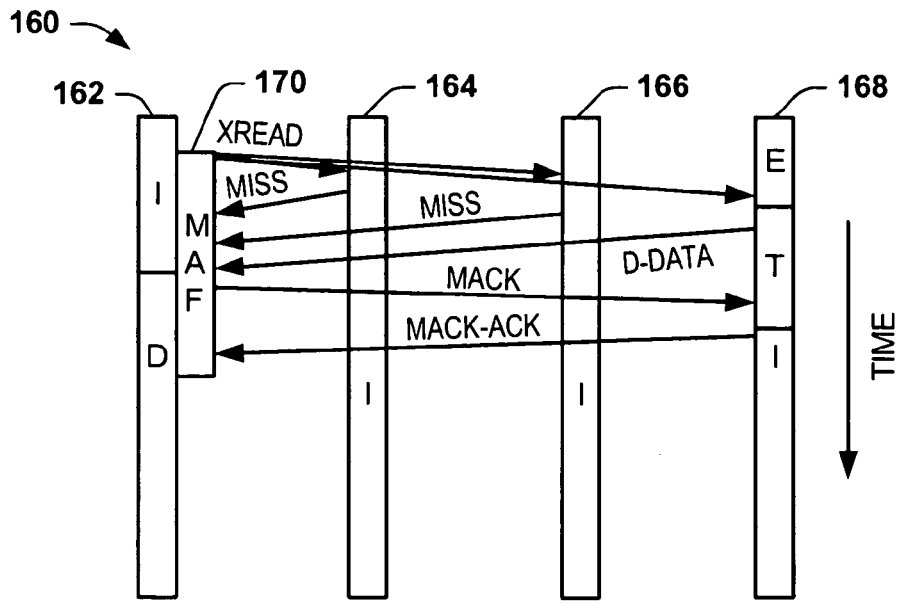
FIG. 4 depicts a first example of an ordering point migration.

Turning to FIG. 4, a multi-processor network 160 is depicted that includes a source node 162, target nodes 164 and 166 and an owner node 168. Initially, the nodes 162, 164 and 166 are in an I-state for a given cache line. The node 168, however, is in an E-state, indicating that the node has an exclusive copy of the data stored in its associated cache. The E-state defines the node 168 as including a cache ordering point for the data. The owner node 168 could also define a cache ordering point for the data if its cache line were in other states, including an M-state, an O-state, an F-state or a D-state, as described above in Table 1. The source node 162 allocates a MAF entry 170 and issues a source broadcast request for desired data.

The example of FIG. 4 assumes that the request is a source broadcast read request (XREAD) for a copy of the data, although other types of requests could also be utilized with similar results. Each of the target nodes 164 and 166, being in the I-state when the broadcast XREAD is received, responds with a MISS response. Since the owner node 168 is in the E-state for the cache line containing the requested, the node transitions to the T-state and responds with an ownership data response, indicated as D-data. D-data corresponds to an ownership data response indicating that the ordering point is being transferred from the owner node 168 to the requesting processor, namely, to the source node 162. In response to receiving the D-data and all other snoop responses, the source node 162 transitions from the I-state to the D-state. Also in response to receiving the D-data, the source node 162 issues a MACK signal to the node 168 acknowledging that the cache ordering point has successfully migrated to the node 162. The node 168, in turn, responds to the MACK signal with an MACK-ACK signal, as well as transitions from the T-state to the I-state. The corresponding MAF entry 170 also is removed, which enables the node 162 (as the new ordering point) to respond to subsequent data requests. The nodes 164 and 166 remain in the I-state.

Figure 5:
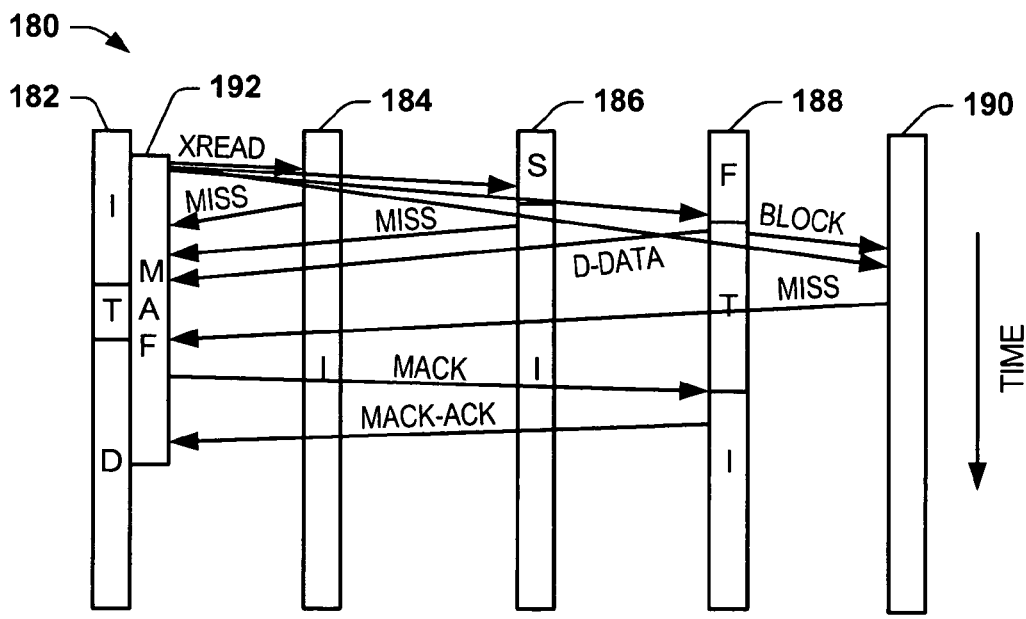
FIG. 5 depicts a second example of an ordering point migration.

FIG. 5 depicts another example scenario that may occur using a broadcast-based coherency protocol in a network 180 that includes a source node 182, target nodes 184 and 186, an owner node 188 and a home node (e.g., memory) 190. The nodes 182 and 184 are initially in the I-state, the node 186 is in the S-state, and the owner node 188 is in the F-state. The source node 182 allocates a MAF entry 192 associated with an request for desired data, and issues a source broadcast read request XREAD to the network 170 (e.g., a read request that permits data to migrate and/or be modified). Those skilled in the art will appreciate various other types of requests that could be broadcast by the source node 182 in the network 180.

The target node 184 responds with a MISS response. The target node 186, being in the S-state, transitions from the S-state to the I-state since the request broadcast by the source node 182 is a type of request enabling the source node to modify the data (e.g., a broadcast read-modify request). The node 186 also transmits a MISS response to the source node 182. In response to receiving the broadcast XREAD request, the owner node 188 provides an ownership data response that includes D-data to the source node 182. The owner node also transitions from the F-state to the T-state.

The home node 190 for the requested data can respond with a memory copy of the data (M-data). Alternatively, as depicted in FIG. 5, the owner node 188 can provide a BLOCK signal to the home node 190 substantially concurrently with its ownership data response. The BLOCK signal instructs the home node 190 that is not required to respond with a copy of the data to the XREAD request. Since the home node responds with a non-data MISS response instead of an actual copy of the data, the overall bandwidth and memory usage can be reduced. In practice, the benefits will depend on whether the home node 190 receives the BLOCK signal before the XREAD request from the source node 182. Hence, the beneficial effects of the BLOCK signal (e.g., reducing memory bandwidth) can be considered opportunistic.

The source node 182 transitions from the I-state to the T-state in response to receiving the D-data from the owner node 188. The T-state operates as a temporary state that postpones utilization of the D-data received from the owner node 188 until all responses to the broadcast XREAD request have been received by the source node 182. The last response received by the source node 182 is the MISS response provided by the home node 190. After receiving all the responses, the source node 182 transitions from the T-state to the D-state, which defines the source node 182 as a cache ordering point for the requested data in network 180. The transition to the D-state also results in the source node 182 providing a MACK signal to the owner node 188. The MACK signal causes the owner node 188 to release the T-state, transitioning from the T-state to the I-state and, in turn, to provide a MACK-ACK signal back to the source node 182. The source node 182 also removes its MAF entry 192 to enable the node (as the new ordering point) to respond to subsequent data requests. The target nodes 184 and 186 remain in the I-state.

Figure 6:
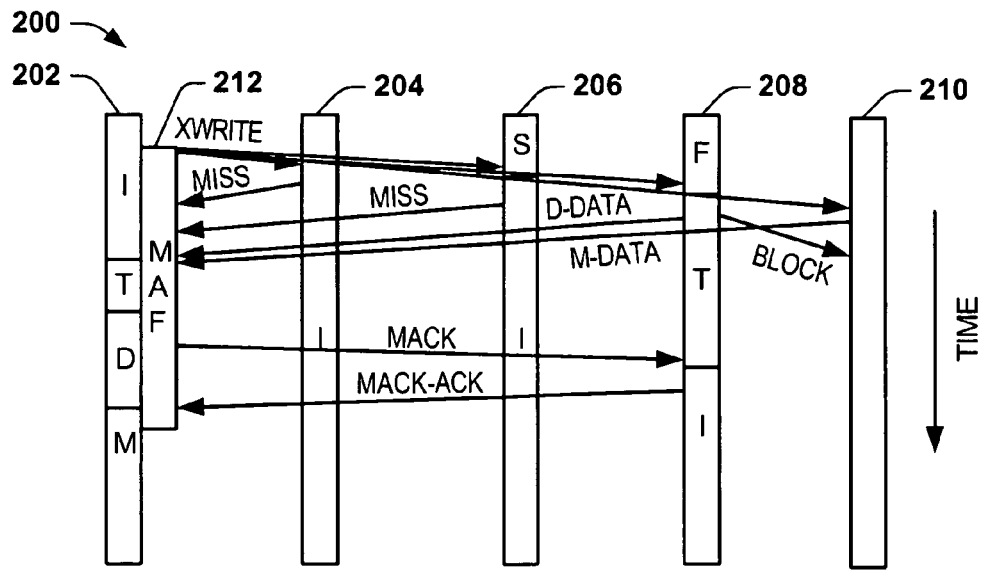
FIG. 6 depicts a third example of an ordering point migration.

FIG. 6 depicts another example of a multi-processor network 200 implementing a broadcast-based cache coherency protocol. The network 200 includes a source node 202, target nodes 204 and 206, an owner node 208 and a home node 210. The owner node 208 initially is in the F-state for the data, which defines the node as a cache ordering point for the data in the network 200.

The source node 202 issues a XWRITE request using the broadcast-based protocol. The XWRITE request, for example, corresponds to a broadcast snoop request that enables the source node to read and modify the data, but that does not require an update to the memory's home (e.g., a broadcast read-modify command of Table 2). Upon receiving the XWRITE request, the target nodes 204 and 206 respond with MISS responses. The target node 206 also transitions from the S-state to the I-state. The owner node 208 provides an ownership data response that includes D-data, and transitions from the F-state to the T-state. The owner node 208 can also provide a BLOCK signal to the home node 210 in conjunction with providing the D-data to the requester source node 202.

In response to receiving the D-data, the source node 202 transitions from the I-state to the T-state. The source node can remain in the T-state until responses have been received from all other nodes in the network 200. Thus, upon receiving the response from the home node 210, the source node 202 transitions from the T-state to the D-state. Since the BLOCK signal reaches the home node 210 after (or at least concurrently with) the arrival of the broadcast XWRITE request, the home node 210 may provide a response that includes M-data to the source node 202. The D-data from the node 208 overrides the M-data since such data may be more current than the memory.

The source node also issues a MACK signal to the owner node 208 associated with its transition to the D-state. The MACK signal causes the owner node 208 to transition from the T-state to the I-state. The transition to the I-state further results in the owner node 208 providing a MACK-ACK signal back to the source node 202. Upon receiving the MACK-ACK signal, the source node 202 transitions from the D-state to the M-state and the source node retires the MAF entry 212. Thus, in the M-state, the node 202 can modify (e.g., write to) the data in the associated cache line, although the data must write the data back to the memory (e.g., the home node 210) upon displacing the data to another node in the network 200. The nodes 204-208 remain in the I-state.

Figure 7:
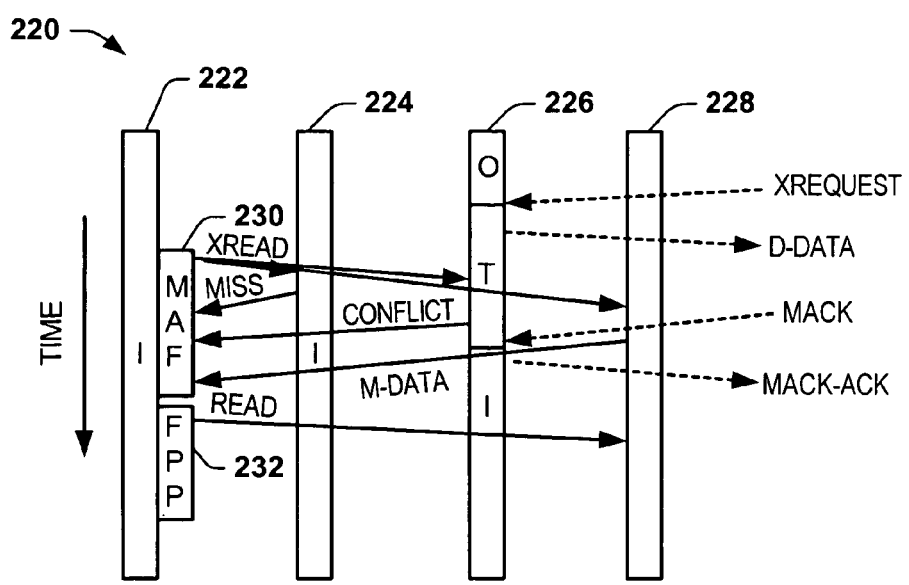
FIG. 7 depicts a fourth example of an ordering point migration.

FIG. 7 depicts an example of a network 220 implementing a hybrid cache coherency protocol, such as a broadcast protocol and a forward progress protocol (e.g., a directory-based protocol). The multi-processor network 220 includes a source node 222, a target node 224, an owner node 226, and a home node 228. Initially, the nodes 222 and 224 are in the I-state and the node 226 is in the O-state. The source node 222 allocates a MAF entry 230 for data required by the source node. The MAF entry 230 corresponds to a request implemented using a broadcast-based protocol, such that the source node 222 issues a source broadcast read XREAD request to the other nodes 224-228. Prior to the broadcast request reaching the owner node 226, however, the owner node transitions from the O-state to the T-state. The transition to the T-state can occur, for example, in response to a broadcast request (indicated at XREQUEST) received at the owner node 226 for the data.

For simplicity of illustration, the requestor that broadcasts the XREQUEST for the data is not shown, and messaging between the owner node 226 and such other node (not shown) is illustrated by dotted lines. The dotted lines are labeled with requests and responses that correspond to the approach described herein that used to transfer the ordering point. For example, in addition to transitioning from the O-state to the T-state, the owner node 226 provides D-data with its response to the other node. The other node, in turn, provides a MACK response, which causes the owner node 226 to transition from the T-state to the I-state for the requested data. Additionally, the owner node 226 responds to the MACK signal with a MACK-ACK signal.

In the example of FIG. 7, when the XREAD request from the source node 222 arrives at the owner node 226, the owner node is in the T-state. Consequently, the owner node 226 responds by providing a CONFLICT response. The home node 228, in contrast, responds with M-data to provide a copy of the requested data to the source node 222. Alternatively, if a block signal had been received prior to the XREAD request, the home node would have provided a MISS response. After receiving responses from all the nodes in the system, the source node 222 reissues the request using the forward progress protocol (FPP) by allocating a corresponding MAF entry, indicated at 232. The transfer to the forward progress protocol (e.g., a directory-based protocol) is in response to the owner node 226 receiving the CONFLICT response from the owner node 226. The MAF entry 232 employed forward progress protocol can be allocated in the same MAF as used in the broadcast-based protocol or a different MAF designated for use in the forward progress protocol. For example, the source node 222 can provide a corresponding READ request directly to the home node 228, which then issues a corresponding snoop based on where its directory indicates a coherent copy should be located. The cache containing the coherent copy (not shown) provides a response to the source node 222 that includes a copy of the requested data. The forward progress protocol includes mechanisms to ensure that a coherent copy is provided to the source node 222.

Figure 8:
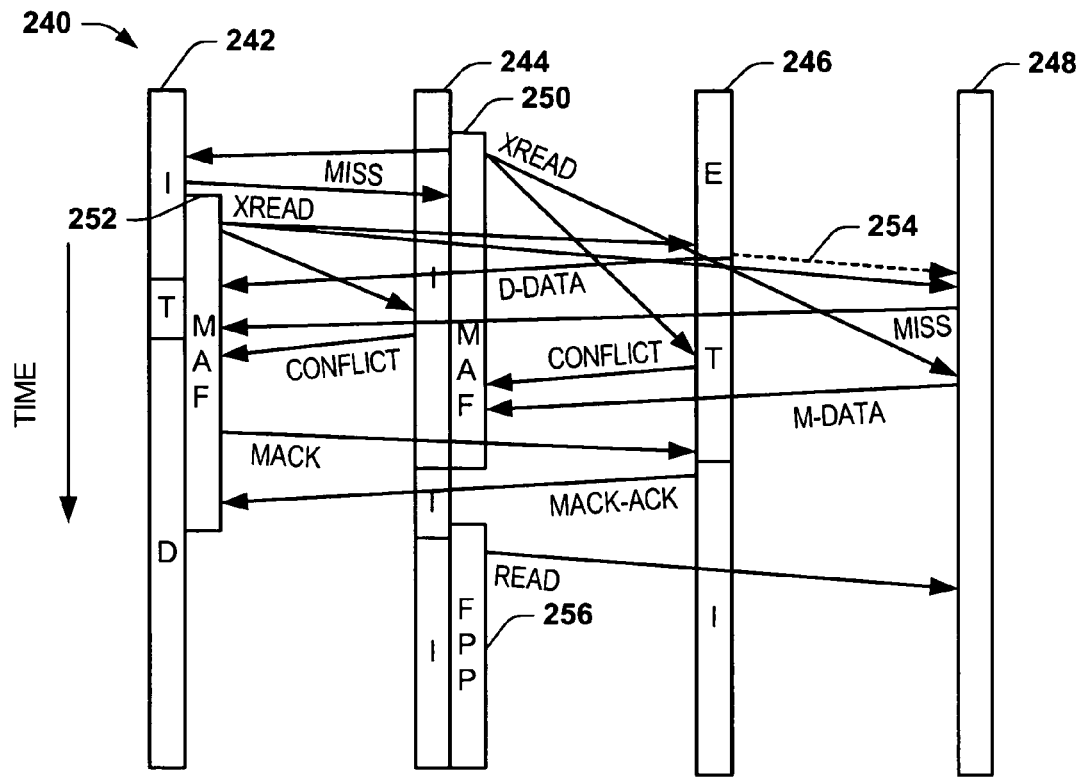
FIG. 8 depicts a fifth example of an ordering point migration.

FIG. 8 depicts another case that can be implemented in a network 240 using a hybrid coherency protocol, including both a broadcast protocol and another forward progress protocol. The network 240 includes nodes 242, 244, an owner node 246 and a home node 248. Both nodes 242 and 244 operate as source nodes requesting the same data that is stored in a given cache line of the owner node 246. Accordingly, a conflict situation ensues.

In the example of FIG. 8, the node 244 allocates a MAF entry 250 associated with a source broadcast XREAD read request for the data. The node 244 broadcasts the XREAD request for the data to the other nodes 242, 246 and 248 in the network. The node 242 (being in the I-state when the request is received) responds with a MISS response, indicating that the node does not have a valid copy of the requested data. Thereafter, the node 242 allocates a MAF entry 252 for requesting the same line of data requested by the node 244 using the broadcast-based protocol. Since more than one node requires a copy of the same data, a race condition exists for the data in the network 240.

The node 244 responds to the broadcast XREAD request from the node 242 with a CONFLICT response since, when the node 244 receives the request, the node presently includes a MAF entry 250 for the same data. However, the broadcast READ request from the node 242 reaches the owner node 246 prior to the broadcast READ request from the node 244. The owner node 246 provides an ownership data response to the node 242 that includes D-data. As described herein, the D-data is utilized to transfer the cache ordering point that was previously associated with the owner node 246 to the node 242 along with the copy of the requested data. The D-data also services as an indication to ignore the CONFLICT message. In conjunction with providing the ownership data response to the node 242, the owner node 246 also transitions from the E-state to the T-state.

The home node 248 also provides a response to the source node 242. In the example of FIG. 8, the broadcast-based protocol is implemented so that the owner node 246 provides a block signal, indicated as a dotted line 254, to the home node 248 in connection with its ownership data response to the source node 242. The block signal 254 arrives at the home node 248 prior to the XREAD request broadcast from the source node 242. Accordingly, the home node 248 provides a MISS response to the source node 242. Alternatively, if the block signal 254 arrived at the home node 248 after the XREAD request, its response would contain a memory copy of the requested data.

The source node 242 also provides a MACK signal to the owner node 246 after receiving responses from all other nodes in the network 240. The owner node 246 transitions from the T-state to the I-state upon receiving the MACK signal, and then transmits a corresponding MACK-ACK signal back to the source node 242.

Since the owner node 246 is in the T-state, when the node receives the broadcast XREAD request from the node 244, the node 246 responds with a CONFLICT response. The home node 248, however, responds with M-data to the broadcast XREAD request provided by the node 244. Based on the set of responses received by the node 244, the node 244 transitions temporarily to a T-state, and then reissues the request using a forward progress protocol (e.g., a directory-based protocol). In particular, in response to receiving the CONFLICT message, plus the absence of a D-data message causes the node 244 to reissue the request using the forward progress protocol.

The node 244 thus allocates a MAF entry, indicated at 256, using the FPP protocol. The MAF entry 256 can be allocated into the same MAF or a different MAF from where the entry 250 was allocated. The node 244 then reissues the request as a READ request provided to the home node 248 using the forward progress protocol. Thus, the request is ensured to complete. The hybrid protocol implemented by the network 240 facilitates migration of cache ordering points, such as from the node 246 to the node 242, while using the broadcast-based protocol. The system can employ the forward progress protocol when conflicts arise, such as those described herein as well as other possible conflict situations.

Figure 9:
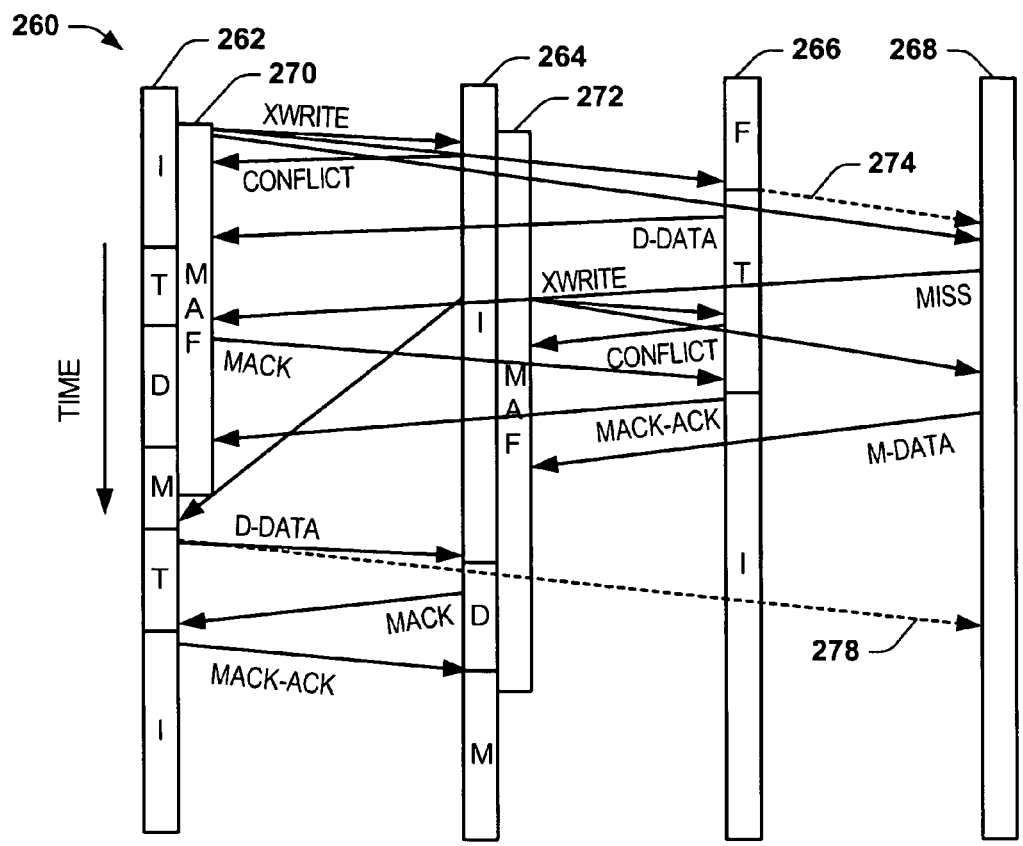
FIG. 9 depicts a sixth example of an ordering point migration.

FIG. 9 illustrates another example of a network 260 implementing a cache coherency protocol that facilitates ordering point migration. The scenario depicted in FIG. 9 demonstrates two consecutive cache ordering point migrations. In both ordering point migrations, the ownership data responses override pending conflicts detected by the source node. The network 260 includes a node 262, node 264, an owner node 266 (in the F-state) and a home node 268. The nodes 262 and 264 operate as source nodes, both requesting copies of the same data. The owner node 266 initially operates in the F-state for given data, which defines the owner node as a cache ordering point for such data.

The node 262 allocates a MAF entry 270 for desired data and broadcasts a corresponding XWRITE request to the other nodes 264-268. The node 264 also allocates a MAF entry 272 for the same data. The node 264 provides a CONFLICT response to the node 262 since, when the node 264 receives the XWRITE request, the node 264 includes an outstanding MAF entry 272 for the same data. The owner node 266 responds to the broadcast XWRITE request from the node 262 by providing an ownership data response that includes D-data. In connection with sending the D-data, the node 266 also transitions from the F-state to the T-state. The node 266 can also send a block signal, indicated as dotted line 274, to the home node 268. Provided that the block signal 274 arrives at the home node 268 prior to the XWRITE request from the node 262, the block signal 274 can prevent the node 268 from responding with a memory copy (M-data) of the requested data. The home node 268 will respond with a MISS response to the node 262.

When the node 262 receives the ownership data response (D-data) from the node 266, the node 262 transitions from the I-state to the T-state. Even though the node 262 received a CONFLICT response from the node 264, the D-data from the owner node 266 overrides the conflict, thereby enabling the node 262 to transition from the T-state to the D-state upon receiving responses from all nodes in the network 260. As a result, the node 262 becomes a cache ordering point for the requested data. Additionally, the node 262 provides a MACK signal to the owner node 266 after receiving a complete set of responses from the network 260. The owner node 266 transitions from the T-state to the I-state based on the MACK signal from the node 262, and then transmits a MACK-ACK signal back to the source node 262. Since the node 262 has issued a broadcast XWRITE request, the MACK-ACK signal enables the node 262 to transition from the D-state to the M-state. As described herein, the M-state enables the node 262 to write to the associated data presently stored in its cache.

The node 264 also issues a corresponding XWRITE request for the same data that was requested by the node 262. However, the XWRITE request is received at the owner node 266 while in the T-state. As a result, the node 266 provides a CONFLICT response to the node 264, identifying that the node 266 is presently in the T-state. The home node 268, however, provides a data response that includes a copy of the requested data (M-data). The XWRITE request broadcast by the node 264 is received at the node 262 while in the M-state and operating as the cache ordering point for the requested data. As a result, the node 262 transitions from the M-state to the T-state, and provides corresponding ownership data response to the node 264 that includes D-data, thereby transferring the ordering point from the node 262 to the node 264. That is, the ownership data response from the node 262 overrides the conflict received from the node 266.

The node 262 can also provide a blocking signal 278 to the home node 268 in conjunction with providing the D-data to the node 264. The node 264 can transition from the I-state to the D-state in response to receiving the ownership data response from the node 262. The node 264 in turn provides a corresponding MACK signal to the node 264 in acknowledgement of receiving the D-data. Furthermore, the node 262 transitions from the T-state to the I-state in conjunction with providing the MACK-ACK signal to the node 264. The MACK-ACK signal results in the sate of the node 264 to transition from the D-state to the M-state, which enables the node 164 to modify the data received as the ownership data response (D-data). The example of FIG. 9 thus depicts a pair of consecutive cache-to-cache ordering point migrations; namely, a first migration from the node 266 to the node 262 and a second migration from the node 262 to the node 264.

In view of the above, those skilled in the art will understand and appreciate that the coherency protocols described herein enables and facilitates migration of ordering points from the cache of one processor to the cache of another processor. The movement of the ordering point facilitates accessing and modification of data while a broadcast-based cache coherency protocol continues to run, and by running enables the ordering point migration. As a result, the approach affords reduced latency for a cache hit, instead of a greater number of hops, as would typically be required for accessing data in a directory-based protocol. Additionally, the approach employs a hybrid protocol that enables non-fillable broadcast requests (e.g., in conflict situations) to be reissued using an associated forward progress protocol (e.g., a directory-based protocol).

Figure 10:
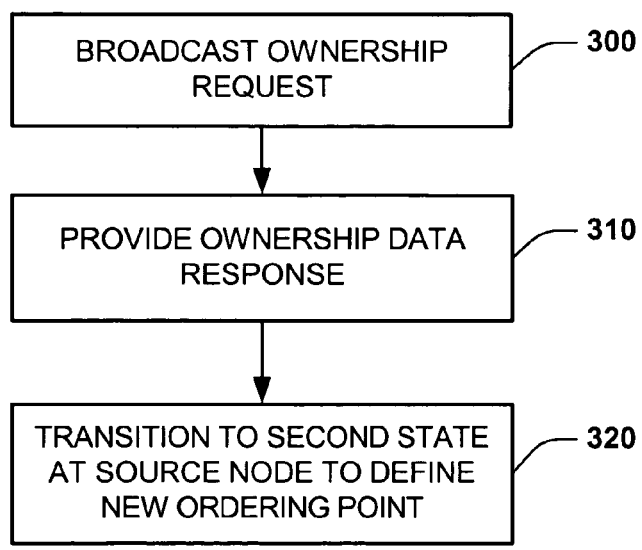
FIG. 10 depicts a flow diagram illustrating a method.

FIG. 10 depicts a method that includes broadcasting from a source node a request for requested data, as shown at 300.

The method also includes providing an ownership data response from an owner node in response to the request from the source node, as shown at 310. The method further includes transitioning a state at the source node associated with the requested data from a first state to a second state in response to receiving the ownership data response, the second state defining the source node as a new cache ordering point, as shown at 320.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a first node that broadcasts a request for data; and
   a second node having a first state associated with the data that defines the second node as an ordering point for the data, the second node providing a response to the first node that transfers the ordering point to the first node in response to the request for the data;
   wherein the second node transitions from the first state to a transition state associated with migration of the ordering point to the first node;
   wherein the first node transitions to a second state associated with the data in response to receiving the response from the second node, the second state defining the first node as the ordering point for the data;
   wherein the first node comprises a processor having an associated cache that comprises a plurality of cache lines, one of the cache lines having an address associated with the data, the second state identifying the one of the cache lines as the ordering point for the data in the system; and
   wherein the first node provides an acknowledgment signal to the second node after receiving responses from other nodes in the system.

2. The system of claim 1, wherein the second state corresponds to a state of a cache line that contains the data, the second state enabling the first node to provide an ownership data response that includes a copy of the data to requests for the data.

3. The system of claim 1, wherein the second node comprises a processor having an associated cache that comprises a plurality of cache lines, one of the cache lines of the second node that contains the data transitioning from the first state to the transition state associated with migration of the ordering point to the first node.

4. The system of claim 1, further comprising a multi-processor system implementing a source broadcast protocol, the system further comprising a third node that issues a broadcast request that is received at the second node while in the transition state, the third node reissuing the broadcast request as a request employing an associated forward progress protocol implemented in the system in response to receiving a conflict response from the second node.

5. The system of claim 4, wherein the forward progress protocol comprises a directory-based protocol.

6. The system of claim 1, wherein the second node provides a signal to the first node indicating receipt of the acknowledgement signal.

7. The system of claim 1, wherein the request for the data comprises a request for the data requiring write permission.

8. The system of claim 7, wherein the request for the data further comprises one of a source broadcast read request or a source broadcast write request for the data, and the response from the second node comprises a corresponding ownership data response.

9. The system of claim 1, wherein each cache line has a respective address that identifies associated data and state information that identifies a state of the associated data for the respective cache line, each of the processors being capable of communicating with each other via an interconnect.

10. The system of claim 9, wherein each processor further comprises a cache controller that controls the state of the data stored in the plurality of cache lines thereof, at least the cache controller of the first node further comprises a state engine capable of modifying the state information for the cache line associated with the data to a state that defines the cache line associated with the data as the ordering point based on the response provided by the second node.

11. A computer system, comprising:
    a source processor that issues a broadcast request for desired data while having a first state associated with the desired data; and
    an owner processor having an associated cache that includes the desired data in a cache line, the cache line having an associated state that defines a copy of the desired data as an ordering point for the desired data, the owner processor responding to the broadcast request with an ownership data response that includes the desired data, the source processor transitioning from the first state to a second state associated with the desired data based on the ownership data response, the second state defining the source processor as the ordering point for the desired data;
    wherein the source processor provides an acknowledgment signal to the owner processor after receiving a complete set of responses from the system, the acknowledgement signal enabling the owner processor to transition from a transition state to an invalid state.

12. The system of claim 11, wherein the source processor further comprises a cache line that contains the desired data received from the owner processor, the cache line of the source processor that contains the desired data having an associated state that transitions to a second state in response to receiving the ownership data response from the owner processor, the second state defining the cache line of the source processor that contains the desired data as the ordering point for the data.

13. The system of claim 12, wherein the second state enables the source processor to respond to requests for the desired data by providing an ownership data response that includes a copy of the desired data.

14. The system of claim 13, wherein the state associated with the cache line of the owner processor transitions from a first state to a transition state in connection with providing the ownership data response to the source processor.

15. The system of claim 14, wherein the system employs a source broadcast protocol for controlling the broadcast request issued by the source processor and the response provided by the owner processor, the system further comprising a third processor that issues a broadcast request using the source broadcast protocol that is received at the owner processor while in the transition state, the third processor reissuing the request employing an associated forward progress protocol implemented in the system in response to receiving a conflict response from the owner processor.

16. The system of claim 15, wherein the forward progress protocol comprises a directory-based protocol.

17. The system of claim 11, wherein the owner processor provides a signal to the source processor indicating receipt of the acknowledgement signal.

18. The system of claim 11, wherein the owner processor provides a blocking signal to prevent a home node from responding with a copy of the desired data in response to receiving the broadcast request from the source processor.

19. A system, comprising:
   means for broadcasting a request for data from a first processor node having a cache state associated with the requested data;
   means for providing an ownership data response from a second processor node having a cache state that defines the second processor as a cache ordering point for the requested data;
   means for transferring the cache ordering point from the second processor node to the first processor node associated with the first processor node receiving the ownership data response from the second processor node;
   means for reissuing a request in the system using a forward progress protocol in response to detecting a conflict while employing a source broadcast protocol in each of the means for broadcasting, the means for providing and the means for transferring; and
   means for providing a migration acknowledgment signal to acknowledge receipt of the ownership data response at the first processor node and for transitioning to a cache state at the first processor node that defines the first processor node as the cache ordering point; and
   wherein the first node comprises a processor node that includes a cache having a plurality of cache lines, one of the cache lines of the processor node having a state associated with the requested data, the state associated with the one of the cache lines defining the first node as the new cache ordering point.

20. The system of claim 19, further comprising means for providing a migration acknowledgment signal to acknowledge receipt of the ownership data response at the first processor node and for transitioning to a cache state at the first processor node that defines the first processor node as the cache ordering point.

21. The system of claim 20, further comprising means for acknowledging receipt of the migration acknowledgment signal by the second processor node.

22. A method comprising:
   broadcasting from a source node a request for requested data;
   providing an ownership data response from an owner node in response to the request from the source node;
   transitioning a state at the source node associated with the requested data from a first state to a second state in response to receiving the ownership data response, the second state defining the source node as a new cache ordering point;
   providing a migration acknowledgment signal from the source node to acknowledge receipt of the ownership data response at the source node;
   entering a transition state at the owner node in response to providing the ownership data response; and
   releasing the owner node from the transition state in response to the migration acknowledgment signal;
   wherein the source node comprises a processor node that includes a cache having a plurality of cache lines, one of the cache lines of the processor node containing the requested data based on the ownership data response and having a state associated therewith, the state associated with the one of the cache lines defining the source node as the new cache ordering point.

23. The method of claim 22, wherein the source node and the owner node employ a source broadcast protocol, the method further comprising:
   issuing a broadcast request for the requested data from a third node using the source broadcast protocol; and
   reissuing the broadcast request from the third node as a request using a forward progress protocol in response to the owner node being in the transition state when the owner node receives the broadcast request issued by the third node.

24. The method of claim 22, further comprising providing an acknowledgment signal to the source node to acknowledge receipt of the migration acknowledgment signal at the owner node.

* * * * *